(12) United States Patent
Mitani et al.

(10) Patent No.: US 7,554,628 B2
(45) Date of Patent: Jun. 30, 2009

(54) DISPLAY DEVICE

(75) Inventors: Hideo Mitani, Mobara (JP); Yuuichi Kanesaka, Shirako (JP); Akiyoshi Tobe, Mobara (JP)

(73) Assignee: Hitachi Displays, Ltd., Chiba-ken (JP)

( * ) Notice: Subject to any disclaimer, the term of this patent is extended or adjusted under 35 U.S.C. 154(b) by 470 days.

(21) Appl. No.: 11/408,103

(22) Filed: Apr. 21, 2006

(65) Prior Publication Data

US 2006/0244923 A1    Nov. 2, 2006

(30) Foreign Application Priority Data

Apr. 27, 2005    (JP)    ............... 2005-128859

(51) Int. Cl.
*G02F 1/1335* (2006.01)
(52) U.S. Cl. .......................... 349/95; 349/112
(58) Field of Classification Search ............ 349/58, 349/62, 95, 112; 359/639, 707
See application file for complete search history.

(56) References Cited

U.S. PATENT DOCUMENTS 5,731,857 A * 3/1998 Neijzen ................. 349/95
6,738,199 B2 * 5/2004 Nishioka ................. 359/726
7,268,951 B2 * 9/2007 Dang et al. ............. 359/629
2001/0022636 A1 * 9/2001 Yang et al. .............. 349/65

* cited by examiner

*Primary Examiner*—Dung T. Nguyen
(74) *Attorney, Agent, or Firm*—Reed Smith LLP; Juan Carlos A. Marquez, Esq.

(57) ABSTRACT

The present invention provides a display device having a large-area display region which is capable of performing an image display of high quality by making, even when two display panels abut on each other, an abutting portion becomes inconspicuous. Two optical path changing lenses LPL1, LPE2 are arranged in a state that respective optical path changing lenses LPL1, LPE2 have respective one sides thereof abutted on each other above an abutting portion BE of two display panels PNL1, PNL2. The abutted ends form a straight-line shape on the abutting portion BE. The first optical path changing lens LPL1 and the second optical path changing lens LPL2 have a lens shape such that the lenses change a optical path of an optical image at a portion remote from the abutting portion BE in the viewing point VP direction and, at the same time, an optical image of a non-display region BW including a picture frame where a shield frame SHD is present from a boundary of the abutting portion BE in the direction orthogonal to the abutting portion BE within a display screen is contracted and focused on the viewing point VP in the upward direction orthogonal to a display screen in a boundary of the abutting portion BE.

12 Claims, 6 Drawing Sheets t1=t2

| Angle θ 0° | LX | | | t(mm) | B(mm) | A=t+B(mm) | R(mm) |
|---|---|---|---|---|---|---|---|
| | LX1 (mm) | LX2 (mm) | LY1 (mm) | | | | |
| 20.00 | 31.00 | 35.84 | 0.13 | 5.97 | 23.61 | 29.58 | 90.64 |
| 25.00 | 40.00 | 48.18 | 0.35 | 9.37 | 12.98 | 22.35 | 97.65 |
| 30.00 | 50.00 | 63.00 | 0.85 | 13.90 | 3.28 | 17.13 | 100.00 |

$$\tan \gamma = \frac{t}{LB}$$

_US 7,554,628 B2_

DISPLAY DEVICE

CROSS-REFERENCE TO RELATED APPLICATIONS

The disclosure of Japanese Patent Application No.2005-128859 filed on Apr. 27, 2005 including the specification, drawings and abstract is incorporated herein by reference in its entirety.

BACKGROUND OF THE INVENTION

1. Field of the Invention

The present invention relates to a display device, and more particularly to a display device which makes one sides of two display panels having a small-sized display region abut on each other thus forming a display device having a size twice as large as the above-mentioned each display regions.

2. Description of the Related Arts.

There has been a demand for a display device which arranges two display panels close to each other thus forming a large screen which has a screen size twice as large as a screen size of an original display region of each display panel. In Japanese Patent Laid-Open Hei05-66388 (Patent Document 1), there is disclosed a foldable liquid crystal display device which is configured such that a plurality of liquid crystal display devices is contiguously connected in the planner direction thus forming one large-sized screen as a whole. Further, in Japanese Patent Laid-Open Hei08-190089 (Patent Document 2), there is disclosed a liquid crystal display device having a large-sized screen which, in constituting the large-sized screen by arranging a plurality of liquid crystal display panels in parallel, makes dead spaces of joints of liquid crystal display panels inconspicuous thus allowing the liquid crystal display device to exhibit an excellent display quality. In U.S. Pat. No. 6,262,785B1 (Patent Document 3), there is disclosed a portable liquid crystal display device which arranges two liquid crystal display panels close to each other so as to increase an area of a screen while maintaining the portability.

SUMMARY OF THE INVENTION

In patent document 1, a plurality of small liquid crystal display panels is connected with each other using a flexible cable and is made foldable thus enhancing the portability of the liquid crystal display device. However, a non-display part which is present at an abutting portion of the liquid crystal display panels has an area twice as large as an area of a non display part of each liquid crystal display panel and hence, a viewer feels a discomfort in watching the liquid crystal display panels as one display screen.

In the liquid crystal display device of patent document 2, it is necessary to set a display pixel distance within one liquid crystal display panel and a pixel part distance which sandwiches a joint between two liquid crystal display panels substantially equal to each other. Further, in arranging two liquid crystal display panels close to each other, it is necessary to set a width of a side wall to 0.3 mm or less and a width of the joint of the liquid crystal display panel to 1.5 mm or less. When the liquid crystal display panels which are formed in this manner are arranged close to each other, it is necessary to prevent the joint from being observed with eyes of a viewer using an optical film.

FIG. 11 is a schematic plan view for explaining one example of the conventional display device which forms the display region having a size twice as large as a size of the original display region by making one sides of two display panels abut on each other, and FIG. 12 is a schematic cross-sectional view taken along a line A-A in FIG. 11. Here, FIG. 11 and FIG. 12 shows the constitution in which the respective display panels are arranged in an abutting manner with no gap therebetween and picture frames are not shown in the drawings. In forming the display region having the size twice as large as the size of the original display region by making one sides of two display panels abut on each other, as shown in FIG. 11, it is preferable to make the respective corresponding sides abut on each other by rotating 180 degrees the first display panel PNL1 and the second display panel PNL2 having the same constitution in plane.

As shown in FIG. 12, the first display panel PNL1 is constituted by laminating a first substrate (a TFT substrate in an active matrix type display panel) SUB1A and a second substrate (usually a color filter substrate, a CF substrate) SUB2A to each other and filling liquid crystal in a lamination gap. In the same manner, the second display panel PNL2 is constituted by laminating a first substrate (a TFT substrate in an active matrix type display panel) SUB1B and a second substrate (usually a color filter substrate, a CF substrate) SUB2B to each other and filling liquid crystal in a lamination gap.

In this example, the first substrates SUB1A, SUB1B have at least one sides (here, two sides) projected from the corresponding sides of the second substrates SUB2A, SUB2B. On these projected portions, data drivers (signal line drive circuit chips) DDR1, DDR2 and gate drivers (scanning line drive circuit chips) GDR1, GDR2 are mounted. The display regions AR1, AR2 of the respective first and second display panels PNL1 and PNL2 are set narrower than the surfaces of the respective second substrates SUB2A, SUB2B.

The display panels have peripheries thereof held by shield frames (casings) and a non-display region BW is present at an abutting portion BE of two display panels including the arrangement of the shield frames and the display regions. Accordingly, when an image is displayed using the display regions AR1, AR2 of the respective first and second display panels PNL1, PNL2 as one display region, the above-mentioned non-display region BW becomes conspicuous thus providing a display which gives a discomfort to a viewer.

It is an object of the present invention to provide a display device having a large-area display region which is capable of performing an image display of high quality by making, even when two display panels abut on each other, an abutting portion become inconspicuous.

To achieve the above-mentioned object, a display device of the present invention may include a first display panel and a second display panel which have respective one sides thereof abut on each other along an abutting boundary therebetween, and the display device may further include a first optical path changing lens and a second optical path changing lens which are arranged to cover at least respective regions of the first display panel and the second display panel. The first optical path changing lens and the second optical path changing lens may be formed in a lens shape which allows both lenses to perform an optical path changing operation such that an optical image of a picture frame in the direction orthogonal to the abutting boundary within a display screen is linearly contracted and is focused in the upward direction orthogonal to the display screen in the display screen at the abutting boundary.

Further, the first optical path changing lens and the second optical path changing lens in the display device of the present invention may include respectively, at a portion thereof where a distance from the abutting boundary in the direction orthogonal to the boundary within the display screen is large, a uniform changing region which changes an optical path of an optical image of an image displayed on the display region of the display panel in the upward direction orthogonal to the display screen in the abutting boundary while maintaining the linearity in the direction orthogonal from the abutting boundary and, at a portion thereof where the distance from the abutting boundary in the direction orthogonal to the abutting boundary is small, a non-uniform changing region which changes an optical path of an optical image of an image displayed on the display region of the display panel such that an optical image of the picture frame is contracted and focused linearly in the upward direction orthogonal to a display screen of the abutting boundary.

Further, in the present invention, optical path changing characteristics of the first optical path changing lens and the second optical path changing lens may assume a line symmetry with respect to the abutting boundary. Further, the uniform changing region may have a profile on the display screen side of a cross section thereof formed in an inclined surface in the direction orthogonal to the display screen, and the cross section in which the larger a distance in the direction from the abutting boundary orthogonal to the abutting boundary within the display screen, a distance between the inclined surface and the display screen is increased is formed in a wedge shape. Further, the non-uniform changing region may have a profile on the display screen side of a cross section formed in a curved shape (arc, elliptical arc, parabolic or a curve having a continuous unequal curvature) projecting toward a display panel side in the direction orthogonal to the display screen.

Further, in the present invention, between respect end portions of the first optical path changing lens and the second optical path changing lens except for the abutting boundary and corresponding picture frames of the first display panel and the second display panel, spacers may be arranged, and inner peripheries of the spacers may be arranged to extend forwardly toward the display region side than respective inner peripheries of the first display panel and the second display panel and assume positions at which reflection lights on inner surfaces of the picture frames are prevented from reaching the first optical path changing lens and the second optical path changing lens. Further, a surface of the first optical path changing lens and a surface of the second optical path changing lens may be continuously formed.

Further, a display device of the present invention may include a first display panel and a second display panel which have upper peripheries of respective one sides thereof abut on each other along an abutting boundary therebetween, the display device may further include a first inclined fiber lens and a second inclined fiber lens which are arranged to cover at least respective display regions of the first display panel and the second display panel, the first inclined fiber lens and the second inclined fiber lens are formed of a rectangular plate-shaped body which is obtained by cutting a fiber prism which is formed of a large number of fibers which are bundled and bonded parallel to each other and linearly at a predetermined angle with respect to a long axis of the prism, and lower peripheries of the abutting one sides of the first inclined fiber lens and the second inclined fiber lens are positioned at the display region side than inner peripheries of picture frames of the abutting one sides.

Further, lower peripheries of the first inclined fiber lens and the second inclined fiber lens on sides opposite to the abutting sides may be arranged to be positioned on the display region side than inner peripheries of the picture frames of the first display panel and the second display panel positioned on a side opposite to the picture frames of the respective abutting one sides.

According to another aspect of the present invention, there may be provided a display device which includes a display panel having a picture frame on an outer periphery of the display region, and an optical path changing lens which is arranged above the display panel, wherein the optical path changing lens has a cross-sectional shape thereof which corresponds to one side of the display panel formed such that one side of the cross-sectional shape is formed in a straight-line shape having the inclination with respect to the display panel and another side of the cross-sectional shape is formed in a curved shape (a curve projecting toward the display panel) on a surface side which faces the display panel, and the cross-sectional shape is arranged parallel to a display region of the display panel on a surface side opposite to the surface which faces the display panel.

Here, the optical path changing lens may be supported on spacers which are arranged on the picture frame of the display panel, and the optical path changing lens may be arranged on the picture frame on a straight-line shape side having the inclination with respect to at least the display panel is not arranged on the picture frame on a curved surface shape side.

Further, by arranging the spacers on the picture frame on the straight-line side which has inclination with respect to the display panel in a state that the spacers advances to the display region side than the inner periphery of the picture frame, when a viewer observes the display device from the curved shape side, it is possible to prevent a reflection light on a side surface which constitutes a stepped portion of the picture frame with respect to the display region from reaching the optical path changing lens and hence, the generation of bright lines attributed to the reflection of light on the side surface portion of the picture frame can be suppressed whereby the display can be performed without giving a discomfort to the viewer.

The reason is as follows. As a method for using this display device, there may be a case in which two display devices are arranged such that curved-shape-sides of two display devices face each other to form the large-sized display device. In this case, the viewer's view point exists at a connecting portion of two display devices. Accordingly, when the spacers on the picture frame on the straight-line-shaped side having the inclination with respect to the display panel are not arranged in a state that the spacers advance to the display region side than the inner periphery of the picture frame, the side surface of the stepped portion between the picture frame and the display region is recognized as the bright line due to the reflection light.

Here, the spacers can stably support the optical path changing lens by arranging one U-shaped member including a portion which is arranged on the picture frame of the optical path changing lens on the straight-line-shaped side which has the inclination with respect to the display panel and, at the same time, it is possible to save time and efforts for arranging the spacers.

Although the display device of the present invention may be preferably realized as the liquid crystal display device, the display device of the present invention may be applicable to a display device which uses other panel-type display panel such as an organic EL display device.

According to the present invention, it is possible to provide the large-sized display device which can largely narrow the non-display region between two abutting display panels thus substantially reducing the non-display region to an extent that the non-display region becomes twice as large as the display region of the original display region.

Here, it is needless to say that the present invention is not limited to the above-mentioned constitutions described in the summary of the invention and various modifications are conceivable without departing from the technical concept of the present invention described in claims.

DETAILED DESCRIPTION OF THE INVENTION

Hereinafter, embodiments of the present invention are explained in detail in conjunction with drawings which show the embodiments.

Although the explanation will be made with respect to a case in which liquid crystal display panels are used in the embodiments described hereinafter, the present invention is applicable to display panels of other types. Here, the display panel is also referred to as "cell".

Embodiment 1

Figure 1:
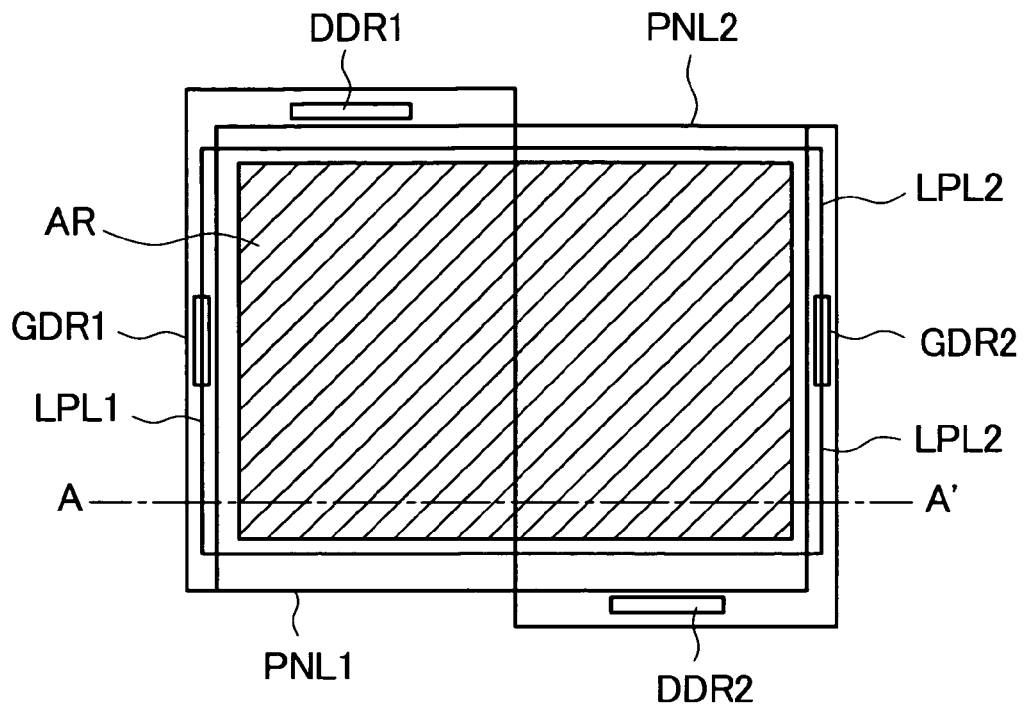
FIG. 1 is an explanatory view of an embodiment 1 of the present invention.
Figure 11:
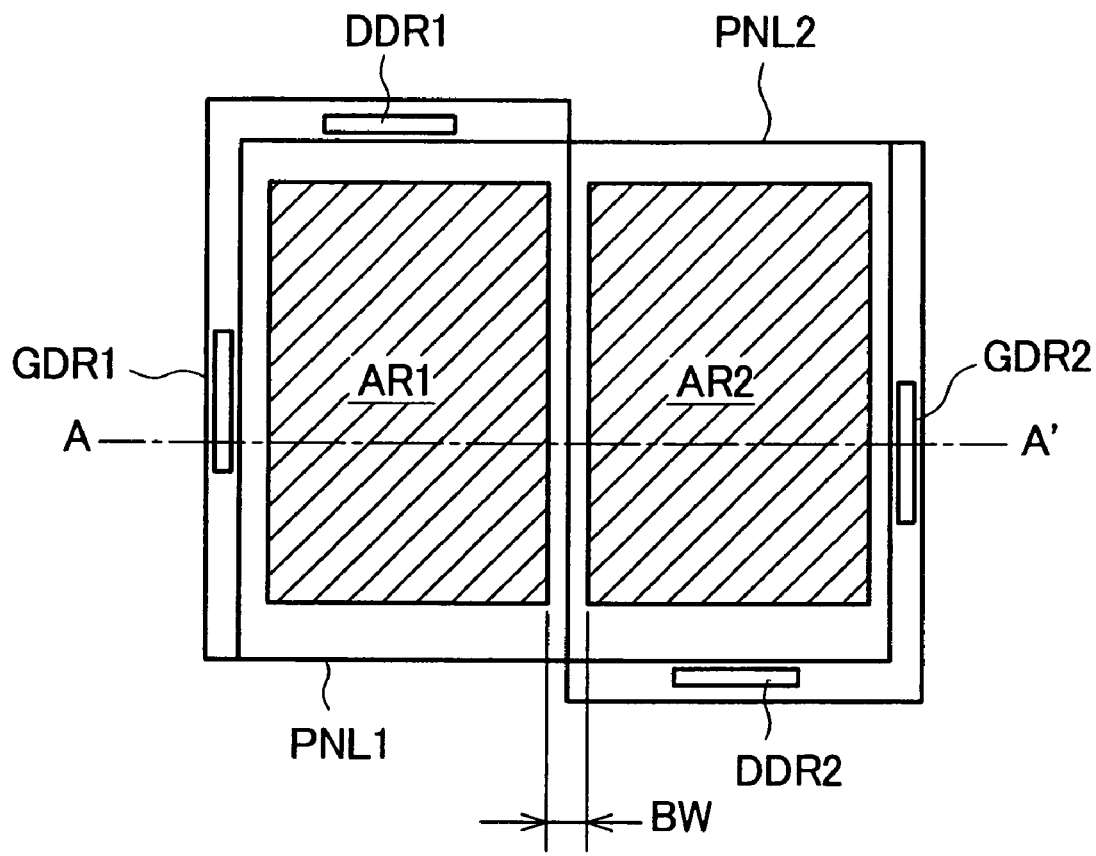
FIG. 11 is a schematic plan view for explaining one example of a conventional display device which is configured such that one sides of two display panels are made to abut on each other to form a display region having a size twice as large as a size of an original display region.

FIG. 1 is an explanatory view of an embodiment 1 of the present invention. The display device has the constitution substantially equal to the constitution explained in conjunction with FIG. 11. That is, a first display panel PNL1 is constituted by laminating a first substrate SUB1A and a second substrate SUB2A to each other and by filling liquid crystal in a lamination gap. In the same manner, a second display panel PNL2 is constituted by laminating a first substrate SUB1B and a second substrate SUB2B to each other and by filling liquid crystal in a lamination gap.

In FIG. 1, the respective first substrates SUB1A, SUB1B of two display panels have two sides thereof projected from corresponding sides of the respective second substrates SUB2A, SUB2B. Data drivers DDR1, DDR2 and gate drivers GDR1, GDR2 are mounted on these projected portions. As mentioned previously, display regions AR1, AR2 of the respective first and second display panels PNL1, PNL2 are set narrower than surfaces of the respective second substrates SUB2A, SUB2B. Further, in this embodiment 1, a first optical path changing lens LPL1 and a second optical path changing lens LPL2 are mounted on the first display panel PNL1 and the second display panel PNL2 in a state that the first optical path changing lens LPL1 and the second optical path changing lens LPL2 cover the respective display regions of the first display panel PNL1 and the second display panel PNL2. Although the optical path changing lenses of the embodiment 1 are formed of an acrylic plate by molding, the optical path changing lenses may be formed of other proper resin material, glass or the like.

Figure 2:
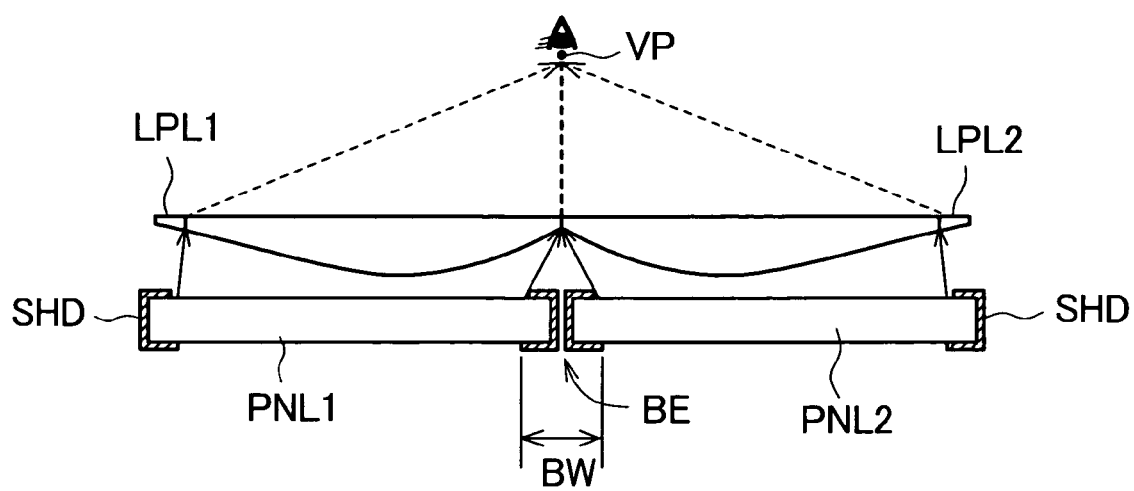
FIG. 2 is an operational explanatory view of the embodiment 1 which is shown as a cross-sectional schematic view taken along a line A-A' in FIG. 1.
Figure 12:
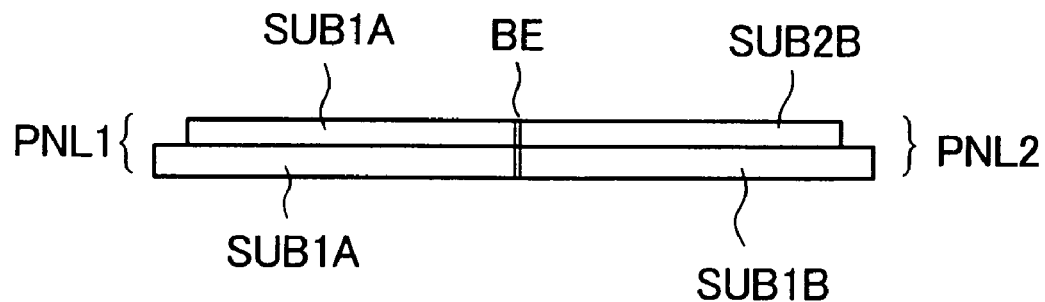
FIG. 12 is a schematic cross-sectional view taken along a line A-A in FIG. 11.

FIG. 2 is an operational explanatory view of an embodiment 1 which is shown as a cross-sectional schematic view taken along a line A-A' in FIG. 1. When the display panels PNL1, PNL2 are formed of the liquid crystal display panel, on back surfaces of the display panels which are constituted of two substrates explained in conjunction with FIG. 12, light guide plates (not shown in the drawing) which constitute back lights are arranged, and the light guide plates have peripheries thereof held by shield frames (holding casings) SHD together with the liquid crystal display panels. Including the shield frames SHD and respective distances between the display regions and panel end peripheries, a non-display region BW is present at an abutting portion BE of two display panels.

The optical path changing lenses LPL1, LPL2 are arranged in an abutting manner above the abutting portion BE of two display panels PNL1, PNL2 where the respective one sides of the respective display panels PNL1, PNL2 abut on each other. Abutting ends of the optical path changing lenses LPL1, LPL2 are formed linearly above the abutting portion BE. The first optical path changing lens LPL1 and the second optical path changing lens LPL2 have lens shapes such that optical paths of optical images at portions remote from the abutting portion BE are changed in the viewing point VP directions and, at the same time, an optical image in the non-display region BW including picture frames in the direction orthogonal to boundaries of the abutting portion BE within display screens is contracted linearly above the abutting portion BE and orthogonal to the boundaries of the abutting portion BE on the display screens and is focused on a viewing point VP.

Figure 3:
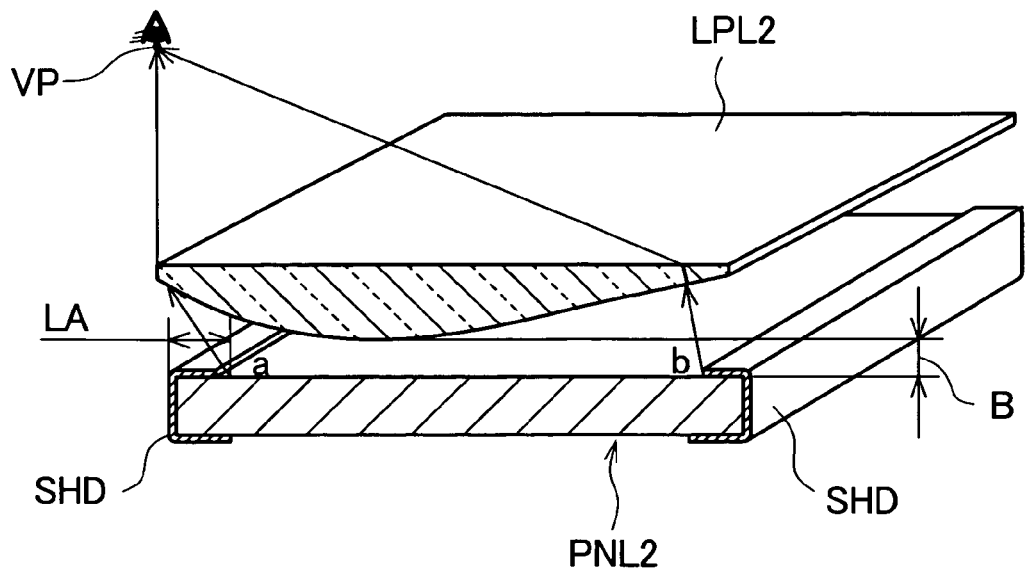
FIG. 3 is a partial perspective view with a part in cross-section for further explaining an operation of an optical path changing lens of the embodiment 1.

FIG. 3 is a partial perspective view with a part in cross section for further explaining an operation of the optical path changing lens of the embodiment 1. Although the explanation is made with respect to the second optical path changing lens LPL2 shown in FIG. 2 in FIG. 3, the same application is applicable to the first optical path changing lens LPL1. The optical path changing lens LPL2 is mounted in a spaced-apart manner from a display screen of the display panel (cell) PNL by a distance (a gap between the acrylic plate and the cell) B. Further, symbol "a" indicates a point on an outer periphery of the display region inside the picture frame arranged on an abutting side of the display panel, and symbol "b" indicates a point on an outer periphery of the display region inside the picture frame on a side opposite to the abutting side of the display panel. Here, the display region is arranged slightly inside than an inner periphery of the shield frame SHD and, usually, a width of the non-display portion is set larger than a width LA of the shield frame SHD.

In FIG. 3, an optical image at the "a" portion is focused on the viewing point VP by way of the optical path changing lens LPL2, while an optical image at the "b" portion is focused on the viewing point VP by way of the optical path changing lens LPL2. Then, due to the presence of the "a" portion, an optical image on the abutting portion BE side, that is, in the non-display region BW is not observed from the viewing point VP side by the optical path changing lens LPL2.

Figure 4:
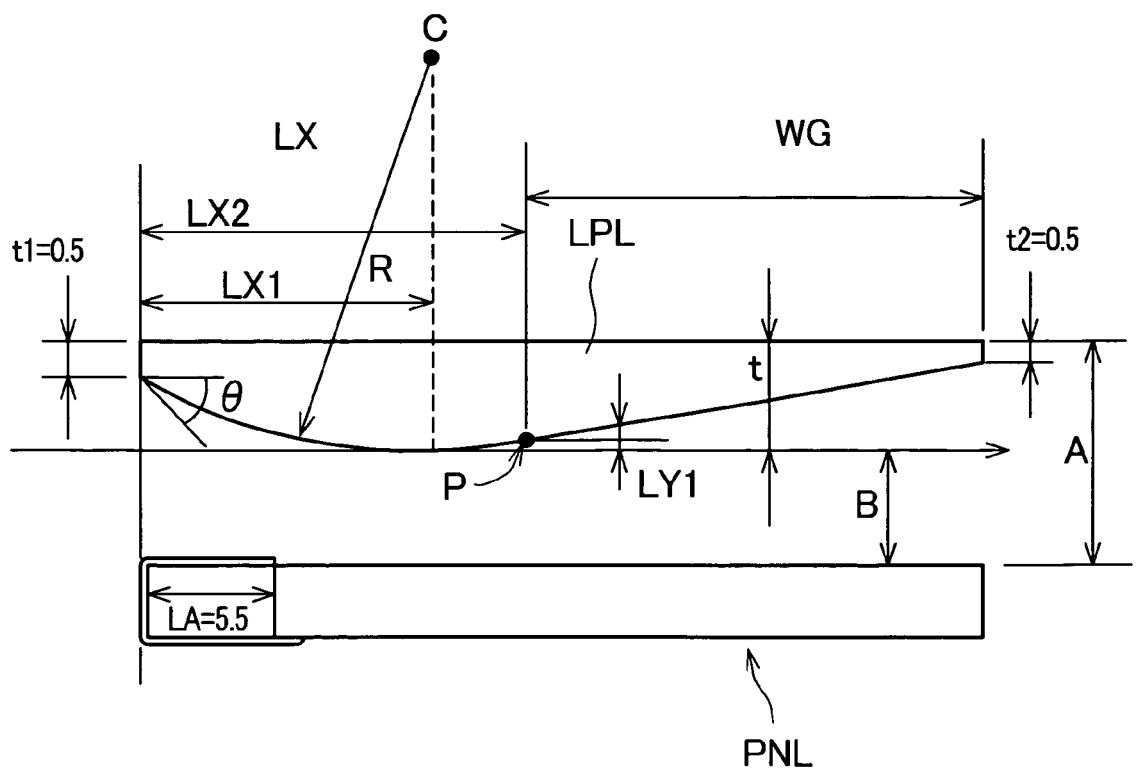
FIG. 4 is an explanatory view of an example of sizes of the optical path changing lens in the embodiment 1.
Figures 5, 6:
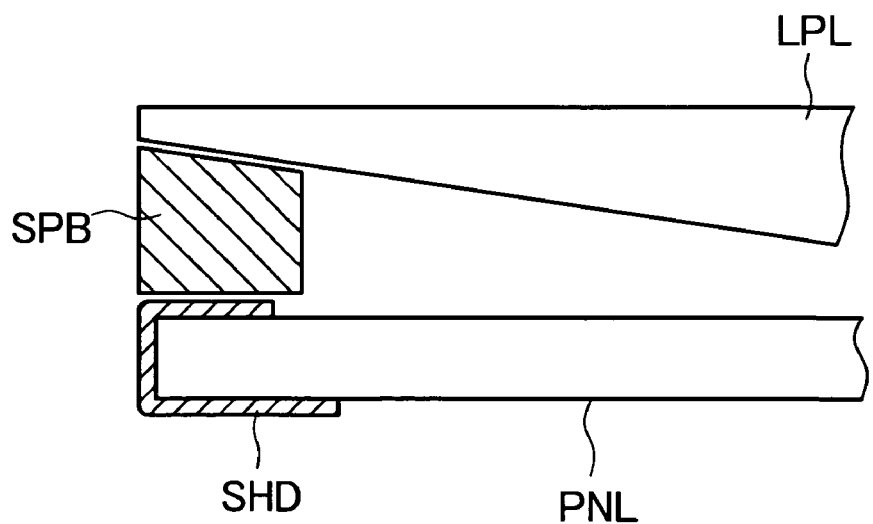
FIG. 5 is a table which shows an example of typical numerical values of respective portions in FIG. 4.
FIG. 6 is a partial cross-sectional view for explaining one example of fixing structure of the optical path changing lens to a display panel on a side opposite to an abutting side.

FIG. 4 is an explanatory view of an example of sizes of the optical path changing lens in the embodiment 1. Further, FIG. 5 is a table which shows an example of typical numerical values of respective portions in FIG. 4 in an arranged manner. In FIG. 5, symbol t indicates a plate thickness of the optical path changing lens LPL, symbol B indicates a distance between the optical path changing lens LPL and the display panel PNL, and symbol A indicates a total distance of the plate thickness t and the distance B. Further, symbol R indicates a curved-portion radius of a curved portion LX. First of all, in FIG. 4, the optical path changing lens LPL is formed of the curved portion LX and a wedge portion WG. Although a boundary between the curved portion LX and the wedge portion WG of the optical path changing lens LPL is variable corresponding to a size of the display panel, the boundary is positioned close to a side at which the optical path changing lens abuts on another optical path changing lens in FIG. 4. An image which passes the curved portion LX is more compressed when the image is arranged closer to the abutting portion and hence, to prevent the whole image attributed to the compression from becoming unnatural, the above-mentioned boundary may be selected such that an optical image which passes a wedge-portion-WG side of the curved portion LX and an optical image which passes the wedge portion WG are naturally transitioned from each other.

The optical path changing lens LPL has a size which allows the optical path changing lens LPL to cover the whole display panel PNL. In FIG. 4, the symbols express the following.

B: gap (cell gap) between display panel PNL and optical path changing lens LPL

LX1: distance from end periphery of abutting portion to position at which line which passes center of radius of curvature C of curved portion LX and is perpendicular to display screen of display panel crosses optical path changing lens LPL LX2: distance within range of arc of curved portion LX LY1: distance (cell gap B) between joint point P of curved portion LX and wedge portion WG and apex of arc of curved portion LX t: maximum plate thickness of optical path changing lens LPL A: distance between viewing-point side surface of optical path changing lens LPL and display screen of display panel (t+B: total distance)

LA: picture frame width on abutting side

R: radius of curved portion LX $\theta0$: contact angle of curved portion LX at abutting end Here, both of an abutting-end-potion plate thickness t1 and a plate thickness of t2 of an opposite side of the optical path changing lens LPL are set to 0.5 mm respectively.

That is, in this optical path changing lens, a cross-sectional shape corresponding to a certain one side of the display panel is, on a surface side which faces the display panel, formed in a straight line shape having an inclination with respect to the display panel on one side (wedge portion WG in FIG. 4) and in a curved shape on another side (the curved portion LX in FIG. 4). Further, such cross-sectional shape is formed in a shape parallel to the display region of the display panel on the surface side opposite to the surface which faces the display panel.

As has been explained above, the first optical path changing lens and the second optical path changing lens of this embodiment 1, include respectively, at a portion thereof where the distance from the abutting boundary in the direction orthogonal to the boundary within the display screen is large, the uniform changing region which changes an optical path of an optical image of an image displayed on the display region of the display panel in the upward direction orthogonal to the display screen of the abutting boundary while maintaining the linearity in the direction orthogonal from the abutting boundary, that is, the wedge portion WG and, at a portion thereof where the distance from the abutting boundary in the direction orthogonal to the abutting boundary is small, a non-uniform changing region which changes an optical path of an optical image of an image displayed on the display region of the display panel such that an optical image of the picture frame is contracted and focused linearly in the upward direction orthogonal to a display screen of the abutting boundary, that is, the curved portion LX.

It is preferable to make the optical path changing properties of the first optical path changing lens and the second optical path changing lens assume a line symmetry with respect to the abutting boundary from a view point of acquiring a balance of the display image obtained by both optical path changing lenses. Further, the wedge portion WG has the inclined surface such that the larger the distance in the direction orthogonal to the abutting direction from the abutting boundary within the display screen, the distance between the inclined surface and the display screen is increased with respect to a profile on the display screen side of the cross section of the wedge portion WG in the direction orthogonal to the display screen. Further, although the curved portion LX has a profile on the display screen side of a cross section thereof in the direction orthogonal to the display screen formed in an arc shape, the profile of the curved portion LX is not limited to such a shape and may be formed in an elliptical arc, parabolic arc or a curve which has a continuous non-equal curvature.

FIG. 6 is a partial cross-sectional view for explaining one example of fixing structure of the optical path changing lens to the display panel on a side opposite to the abutting side. The optical path changing lens LPL is laminated to the display panel PNL in a state that a predetermined distance is ensured therebetween using spacers (or a spacer) SPB. The spacers SPB may be arranged such that the spacers SPB also surround a display panel PNL side. Further, the spacers SPB may be also arranged on the abutting side of the display panel. The shield frame SHD which constitutes the picture frame is often formed of metal such as stainless steel. In this case, a portion of light from the display panel is reflected on a side surface of the shield frame SHD and is radiated in the viewing point direction through the optical path changing lens LPL. As a result, the brightness line is generated along the picture frame thus deteriorating the display quality.

In this constitution, in an inner periphery (display region side) of the spacers SPB on the side opposite to the abutting side extends forwardly, that is, projects to the display region side from the inner periphery of the corresponding picture frame of the display panel PNL. In other words, the inner periphery of the spacer SPB overhang on the display screen. Due to such a constitution, it is possible to prevent a reflection light on an inner surface of the picture frame SHD from reaching the optical path changing lens. This structure is also applicable to other sides in the same manner.

Figure 7:
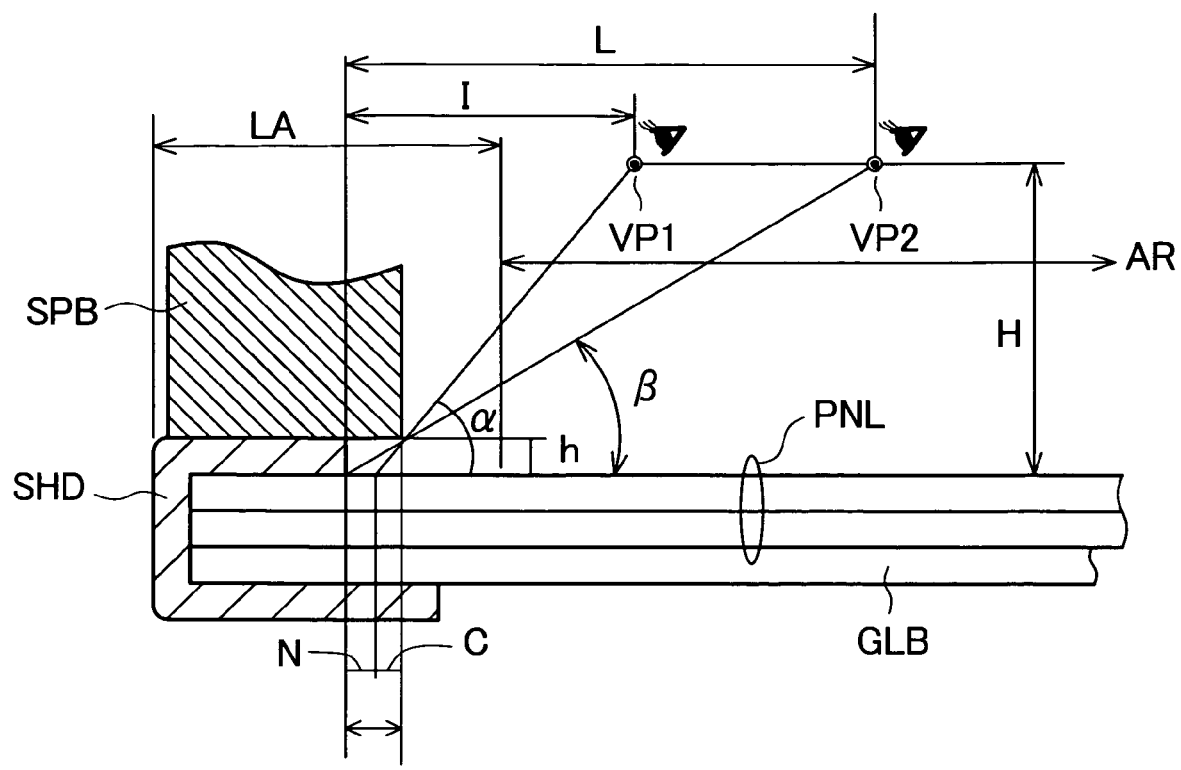
FIG. 7 is a view for explaining the manner of operation of the brightness line preventing structure shown in FIG. 6.

FIG. 7 is a view for explaining the manner of operation of the brightness line preventing structure shown in FIG. 6. In this example, the explanation is made with respect to a case in which the display device uses a liquid crystal display panel as the display panel. A light guide plate GLB which constitute a backlight is arranged on a back surface of the liquid crystal display panel PNL, and the liquid crystal display panel PNL and the light guide plate GLB are integrally formed by the shield frame SHD. The display region AR of the liquid crystal display panel PNL is positioned slightly inside from the inner periphery of the shield frame SHD. An outer periphery of the display region AR constitutes the non-display region, that is, the picture frame.

In FIG. 7, symbol h indicates a plate thickness of an inner side of the shield frame SHD, symbol H indicates a distance perpendicular to the display screen between the display screen and viewing points VP1, VP2, symbol M indicates a distance that the spacers SPB overhang, symbols α and β indicate angles of straight lines for observing the inner periphery of the spacer SPB from the viewing points VP1, VP2, symbols L, I indicate distances parallel to the display screen between the inner periphery of the spacers SPB and the viewing points VP, symbol C indicates a distance parallel to the display screen between a point at which an extension line of a straight line which connects the viewing point VP1 and the projecting periphery of the spacer SPB intersects the display screen and the projecting periphery of the spacers SPB, and symbol N indicates a distance parallel to the display screen between the inner periphery of the shield frame SHD and a point at which an extension of the straight line which connects the viewing point VP1 and the projecting periphery of the spacer SPB intersects the display screen.

Here, assuming the plate thickness h, the distance H and the distance M as h=0.3 mm, H=200 mm, M=0.8 mm, the angle β and the distance L become as β≅20°33', L=≅533 mm. Further, when the angle α is set as α=45°, the distance I, the distance C and the distance N become as I=200 mm, C=0.3 mm, N=0.5 mm. By setting the distance M as M=0.8 mm up to so-called nominal 10 inch class, there is no possibility that the overhang of the spacers SPB conceals the display region AR. The above-mentioned other predetermined numerical values can be calculated in the same manner.

Embodiment 2

Figure 8:
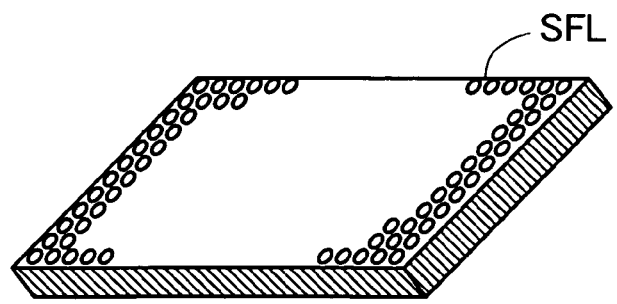
FIG. 8 is a perspective view of an inclined fiber lens for explaining an embodiment 2 of the present invention.
Figure 9:
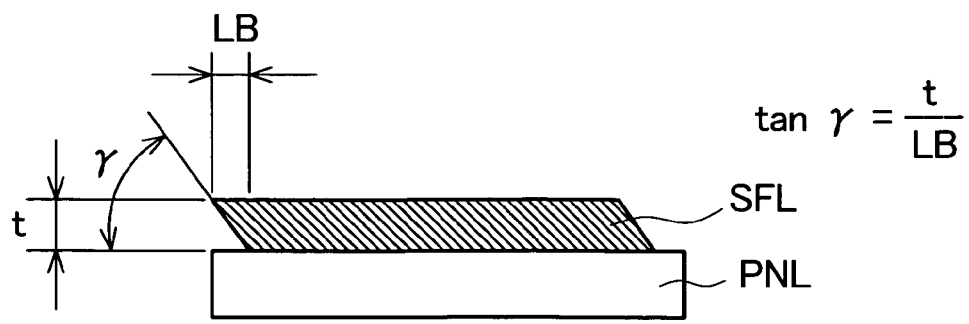
FIG. 9 is a view for explaining a state in which the inclined fiber lens shown in FIG. 8 is mounted on the display panel.

FIG. 8 is a perspective view of an inclined fiber lens for explaining an embodiment 2 of the present invention. Further, FIG. 9 is a view for explaining a state in which the inclined fiber lens shown in FIG. 8 is mounted on the display panel. The inclined fiber lens SFL is a rectangular plate-shaped body which is obtained by cutting a fiber prism which is formed of a large number of fibers which are bundled and bonded parallel to each other and linearly at a predetermined angle with respect to a long axis of the prism.

The inclined fiber lens SFL is, as shown in FIG. 9, mounted on the display screen of the display panel in a state that one surface (an incident surface) of the inclined fiber lens SFL is brought into contact with a display screen of the display panel. A side surface of an abutting side with another display panel is inclined such that the side surface turns down toward the another display panel side with an angle γ. On the other hand, a side surface on a side opposite to the abutting side with another display panel is inclined parallel to the side surface on the above-mentioned abutting side with an angle γ. Assuming a plate thickness of the inclined fiber lens SFL as t and a width of a picture frame as LB, the angle γ is obtained by tanγ=t/LB. That is, the angle γ is determined based on relationship between the plate thickness t of the inclined fiber lens SFL and the width LB of the picture frame.

Figure 10:
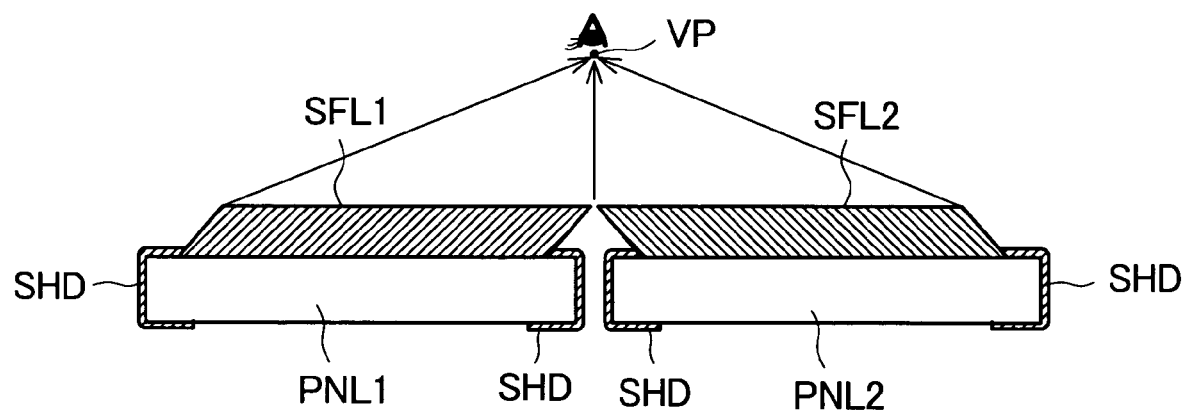
FIG. 10 is a cross-sectional schematic view showing the whole display device of an embodiment 2 in which inclined fiber lenses are respectively overlapped to two respective display panels which abut on each other in a state that the inclined fiber lenses cover the respective display panels.

FIG. 10 is a cross-sectional schematic view showing the whole display device of the embodiment 2 in which inclined fiber lenses are respectively overlapped to two respective display panels which abut on each other in a state that the inclined fiber lenses cover the respective display panels. The inclined fiber lenses SFL1, SFL2 are respectively overlapped to two respective display panels PNL1, PNL2. Further, one sides of the inclined fiber lenses SFL1, SFL2 are made to abut on each other. Then, the inclined fiber lenses SFL1, SFL2 are arranged such that upper peripheries of the sides which turn down toward another display panel sides are brought into contact with each other. Due to such a constitution, an optical image in a non-display region at the abutting portion of two abutted display panels is removed by the inclined fiber lenses and does not reach the viewing point VP. The embodiment 2 can realize the reduction of thickness and the miniaturization of the display device more easily than the embodiment 1.

What is claimed is:

1. A display device comprising:
   a display panel having a picture frame on an outer periphery of a display region; and
   an optical path changing lens which is arranged above said display panel, wherein
   said optical path changing lens is supported on a spacer which is arranged on said picture frame of said display panel, and said spacer is arranged in a U-shape on three sides of said picture frame, and a spacer portion which faces at least one side at which said spacer is not formed is arranged to advance toward said display region side than an inner periphery of said picture frame.

2. A display device according to claim 1, wherein said spacer on said picture frame is arranged in a state that said spacers advances to said display region side than an inner periphery of said picture frame thus preventing a reflection light on an inner surface which constitutes a stepped portion between said picture frame and said display region from reaching said optical path changing lens when a viewer observes said display device from one side on which said spacer is not arranged.

3. A display device which includes a first display panel and a second display panel respectively having display screens which define a picture frames on outer peripheries of display regions, and arranges the first display panel and the second display panel such that a common large-sized display screen is formed of the respective display screens of said first display panel and said second display panel by making the picture frame of one side of said first display panel and said picture frame of one side of said second display panel, wherein
   said first display panel and said second display panel which have respective one sides thereof abut on each other along an abutting boundary therebetween, and said display device includes a first optical path changing lens and a second optical path changing lens which are arranged to cover at least respective display regions of said first display panel and said second display panel,
   said first optical path changing lens and said second optical path changing lens are formed in a lens shape such that an optical image of a picture frame in the direction orthogonal to the abutting boundary within a display screen is linearly contracted and is focused in the upward direction orthogonal to the display screen at the abutting boundary, and
   said first optical path changing lens and said second optical path changing lens include respectively, at a portion thereof where a distance from the abutting boundary in the direction orthogonal to the boundary within the display screen is large, a uniform changing region which changes an optical path of an optical image of an image displayed on said display region of said display panel in the upward direction orthogonal to said display screen of the abutting boundary while maintaining the linearity in the direction orthogonal from the abutting boundary and, in a portion thereof where the distance from the abutting boundary in the direction orthogonal to the abutting boundary is small, a non-uniform changing region which changes an optical path of an optical image of an image displayed on the display region of the display panel such that an optical image of said picture frame is contracted and focused linearly in the upward direction orthogonal to a display screen of the abutting boundary.

4. A display device according to claim 3, wherein optical path changing characteristics of said first optical path changing lens and said second optical path changing lens assume a line symmetry with respect to said abutting boundary.

5. A display device according to claim 3, wherein the uniform changing region has a profile on the display screen side of a cross section formed in an inclined surface in the direction orthogonal to said display screen, and said cross section in which the larger a distance in the direction from the abutting boundary orthogonal to the abutting boundary within said display screen, a distance between said inclined surface and said display screen is increased is formed in a wedge shape.

6. A display device according to claim 3, wherein said non-uniform changing region has a profile on said display screen side of a cross section formed in a curved shape projecting toward said display panel side in the direction orthogonal to said display screen.

7. A display device according to claim 3, wherein a spacer is arranged between respective end portions of said first optical path changing lens and said second optical path changing lens except for the abutting boundary and corresponding picture frames of said first display panel and said second display panel, and inner peripheries of said spacer is arranged to extend forwardly from inner peripheries of corresponding picture frames of said first display panel and said second display panel and assume positions at which reflection lights on inner surfaces of said picture frames are prevented from reaching said first optical path changing lens and said second optical path changing lens.

8. A display device according to claim 3, wherein a surface of said first optical path changing lens and a surface of said second optical path changing lens are continuously formed.

9. A display device according to claim 3, wherein said first display panel and said second display panel are formed of a liquid crystal display device.

10. A display device which includes a first display panel and a second display panel respectively having a display screen which defines a picture frame on an outer periphery of a display region, and arranges said first display panel and said second display panel such that a common large-sized display screen is formed of the respective display screens of said first display panel and said second display panel, wherein said first display panel and said second display panel have upper peripheries of respective one sides thereof abut on each other along an abutting boundary therebetween, said display device further includes a first inclined fiber lens and a second inclined fiber lens which are arranged to cover at least respective display regions of said first display panel and said second display panel, said first inclined fiber lens and said second inclined fiber lens are formed of a rectangular plate-shaped body which is obtained by cutting a fiber prism which is formed of a large number of fibers which are bundled and bonded parallel to each other and linearly at a predetermined angle with respect to a long axis of the prism, and lower peripheries of the abutting one sides of said first inclined fiber lens and said second inclined fiber lens are positioned at said display region side than inner peripheries of picture frames of the abutting one sides.

11. A display device according to claim 10, wherein lower peripheries of said first inclined fiber lens and said second inclined fiber lens on sides opposite to the abutting sides are arranged to be positioned on said display region side than inner peripheries of said picture frames of said first display panel and said second display panel positioned on a side opposite to said picture frames of the respective abutting one sides.

12. A display device according to claim 11, wherein said first display panel and said second display panel are formed of a liquid crystal display device.

* * * * *